United States Patent
Anthony et al.

(10) Patent No.: US 11,430,237 B1
(45) Date of Patent: Aug. 30, 2022

(54) SYSTEMS AND METHODS UTILIZING DISTRIBUTION TREES FOR CONFIDENCE MODELING AND USE OF FORM FIELD DATA

(71) Applicant: INTUIT INC., Mountain View, CA (US)

(72) Inventors: Peter Anthony, Mountain View, CA (US); Preeti Duraipandian, Plano, TX (US); Deepankar Mohapatra, Plano, TX (US); Conrad De Peuter, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/657,054

(22) Filed: Mar. 29, 2022

(51) Int. Cl.
*G06V 30/19* (2022.01)
*G06N 5/00* (2006.01)
*G06V 30/412* (2022.01)
*G06F 40/174* (2020.01)

(52) U.S. Cl.
CPC ........ *G06V 30/1916* (2022.01); *G06F 40/174* (2020.01); *G06N 5/003* (2013.01); *G06V 30/412* (2022.01)

(58) Field of Classification Search
CPC .............. G06V 30/1916; G06V 30/412; G06F 40/174; G06N 5/003
See application file for complete search history.

(56) References Cited

U.S. PATENT DOCUMENTS

| | | | |
|---|---|---|---|
| 2012/0259844 A1* | 10/2012 | Yuan | G06F 16/951 707/723 |
| 2018/0336574 A1* | 11/2018 | Mohan | G06Q 50/01 |
| 2020/0175404 A1* | 6/2020 | Selvanayagam | G06F 9/451 |
| 2021/0176036 A1* | 6/2021 | Gulati | H04L 9/3239 |
| 2021/0192129 A1* | 6/2021 | Garg | G06F 40/174 |
| 2021/0224247 A1 | 7/2021 | Carvalho | |
| 2022/0043858 A1* | 2/2022 | Rinehart | G06F 16/908 |

OTHER PUBLICATIONS

Ram et al., "Density Estimation Trees", KDD '11, Aug. 21-24, 2011, pp. 627-635.
Ram et al., "Fraud Detection with Density Estimation Trees", Proceedings of Machine Learning Research, vol. 71, pp. 85-94, 2017.

* cited by examiner

*Primary Examiner* — Kevin Ky
(74) *Attorney, Agent, or Firm* — DLA Piper LLP (US)

(57) ABSTRACT

Systems and methods that may be used to determine that input form field data is accurate or not, and associate a level of confidence with that determination. The systems and methods may use a multi part confidence model that uses inter-field correlation to tie the correctness of a particular field to the pattern of values seen in other fields of the document the field data is input from.

18 Claims, 7 Drawing Sheets

| | | 500 |
|---|---|---|

| 1 Wages, tips, other compensation | 2 Federal income tax withheld |
|---|---|
| $50,000.00 | $4,700.00 |
| 3 Social security wages | 4 Social security tax withheld |
| $50,000.00 | $31,000.00 |
| 5 Medicare wages and tips | 6 Medicare tax withheld |
| $50,000.00 | $725.00 |
| 7 Social security tips | 8 Allocated tips |

FIG. 5

SYSTEMS AND METHODS UTILIZING DISTRIBUTION TREES FOR CONFIDENCE MODELING AND USE OF FORM FIELD DATA

BACKGROUND

Many computerized services require a user to input data into electronic forms. Oftentimes the input data itself comes from fields within another document or form. For example, an electronic tax preparation form requires information from the user's W-2 form. Sometimes the form field data from the document is manually entered into the electronic document or form by the user. Sometimes the data is pulled from the document using an optical character recognition (OCR) process. Other times, the data may be retrieved by the computerized service on behalf of the user using e.g., an application programming interface (API) call that grabs form field data from a document or form hosted by another service or repository. Regardless of how the form field data is input, it is important for it to be accurate so that the computerized service provides the user with a correct result (e.g., the appropriate tax refund or liability when the service is a tax preparation application).

Accordingly, there is a need and desire for confidently determining whether form field and other data has been accurately input into an electronic document or form.

BRIEF DESCRIPTION OF THE FIGURES

FIG. 5 illustrates an example document comprising multiple form fields that may be used to input form field data in the process illustrated in FIG. 4.

DETAILED DESCRIPTION OF SEVERAL EMBODIMENTS

Embodiments described herein may be used to determine with a high degree of confidence that input form field and other data is accurate or not. The disclosed principles use a multi part confidence model that uses inter-field correlation to tie the correctness of a particular field's value to the pattern of values seen in other fields of the document the data is input from.

In one or more embodiments, trained distribution trees are used for each field to be input. A distribution tree is a decision tree that is trained for a regression task using a set of features and a target variable. In contrast to a standard decision tree regressor, which at inference time returns a single prediction of the target variable for each new example, a distribution tree returns statistics to describe the expected distribution of the target variable. The distribution tree for a particular field is trained using extracted values of other fields from the same document to predict the field's ground truth. The outputs of the distribution trees may be used to develop new features to be input into a binary classifier. These features reflect the predicted distribution of each field and where the value actually extracted sits in the distribution. For example, one feature may be the Z-score of the extracted value (i.e., the number of standard deviations the extracted value is away from the mean). If the Z-score is high, for example, the form field value is larger than most examples seen during training for other comparable documents and the classifier output may be indicative that the form field value is most likely incorrect. Conversely, if the Z-score is close to zero, the form field value is close to the mean of examples seen during training and the classifier output may be indicative that the form field value is likely to be correct.

Figure 1:
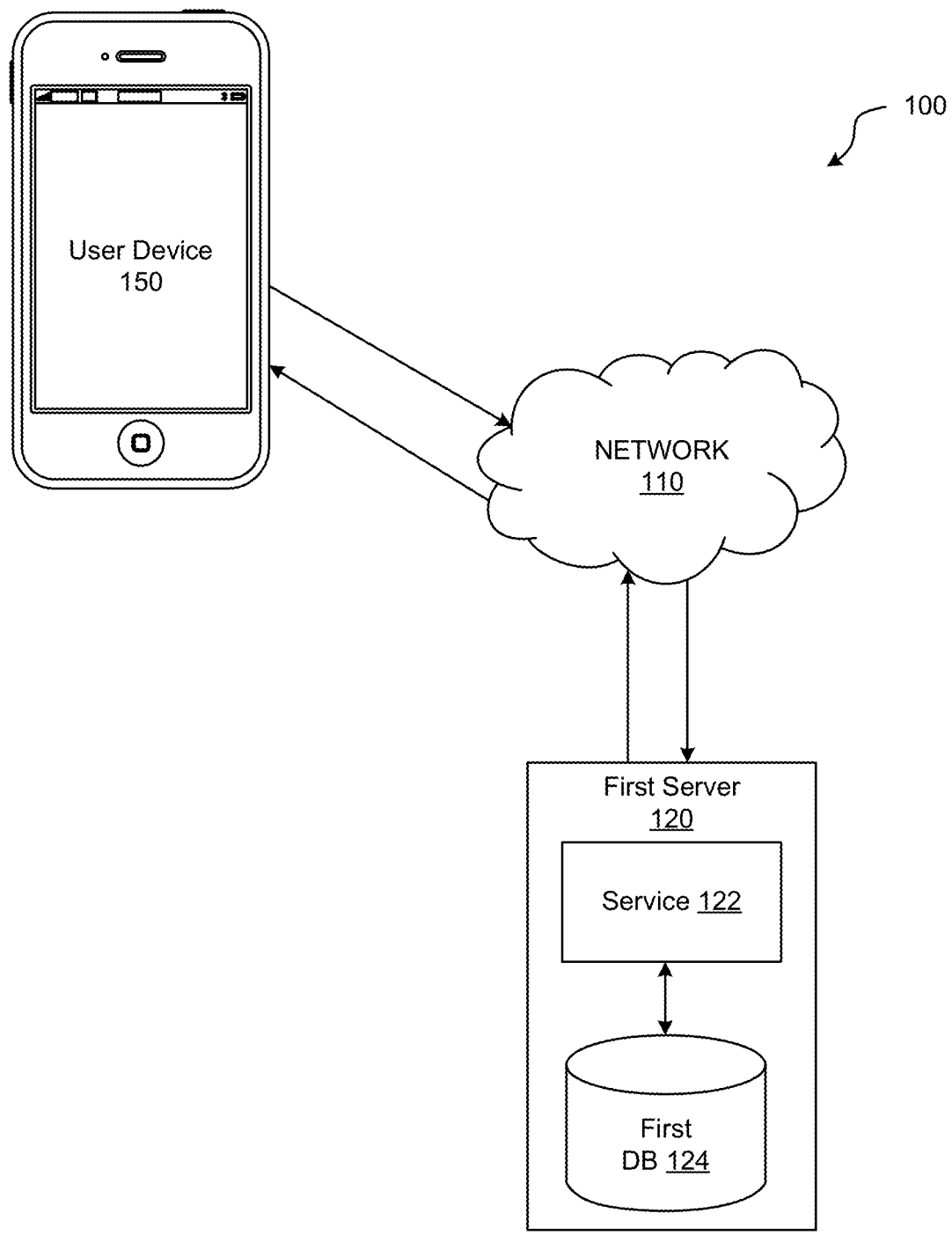
FIG. 1 shows an example of a system configured to implement a process for determining a confidence level of input data in accordance with an embodiment of the present disclosure.

FIG. 1 shows an example of a system 100 configured to implement a process for determining a confidence level of input data, particularly form field data, according to an embodiment of the present disclosure. System 100 may include a first server 120 and/or a user device 150. First server 120 and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like. Network 110 may be the Internet and/or other public or private networks or combinations thereof.

First server 120 may be configured to implement a first service 122, which in one embodiment may be used to input data such as form field data from a user and determine whether the input data is accurate or not based on inter-field correlations in accordance with the disclosed principles. In one or more embodiments, the data may be input via network 110 from one or more databases 124, other servers (not shown) and/or user device 150. For example, first server 120 may execute the process for determining a confidence level of input data according to the disclosed principles using data stored in database 124 and or received from another server and/or user device 150. First service 122 may implement a tax service, an accounting service, other financial service and or information service, which may maintain data used throughout the process disclosed herein. The tax, accounting, financial and or information services may be any network 110 accessible service such as TurboTax®, QuickBooks®, Mint®, and their respective variants, offered by Intuit® of Mountain View, Calif.

User device 150 may be any device configured to present user interfaces and receive inputs thereto. For example, user device 150 may be a smartphone, personal computer, tablet, laptop computer, or other device.

First server 120, first database 124, and user device 150 are each depicted as single devices for ease of illustration, but those of ordinary skill in the art will appreciate that first server 120, first database 124, and/or user device 150 may be embodied in different forms for different implementations. For example, first server 120 may include a plurality of servers or one or more databases 124. In another example, a plurality of user devices 150 may communicate with first server 120. A single user may have multiple user devices 150, and/or there may be multiple users each having their own user device(s) 150.

Figure 2:
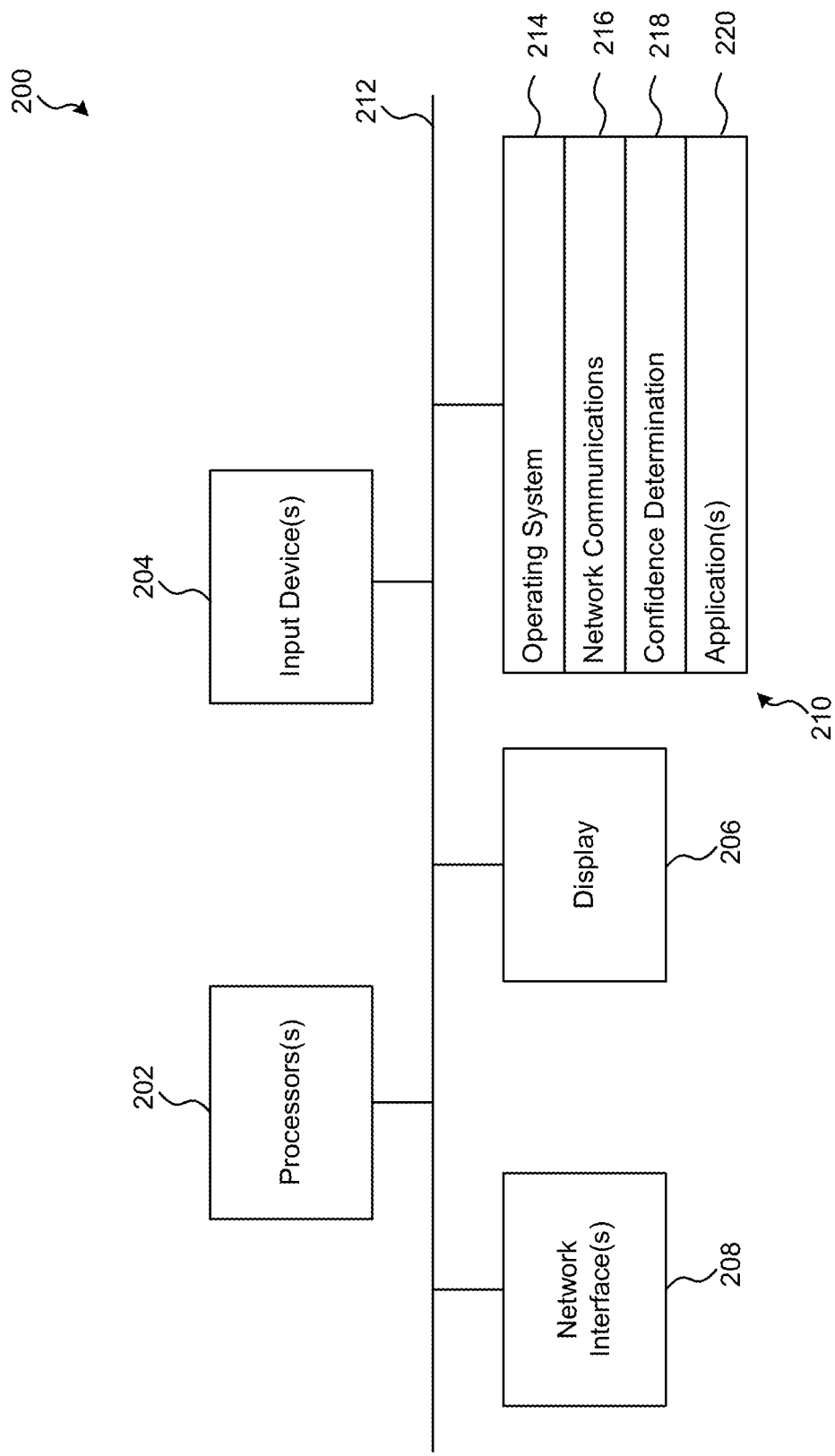
FIG. 2 shows a server device according to an embodiment of the present disclosure.

FIG. 2 is a block diagram of an example computing device 200 that may implement various features and processes as described herein. For example, computing device 200 may function as first server 120 in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by at least one bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, USB, Serial ATA or FireWire. Computer-readable medium 210 may be any non-transitory medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Confidence determination instructions 218 may include instructions that implement the disclosed confidence level determinations and processing described herein, including the disclosed confidence model and its use as discussed in greater detail below. Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Python, Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
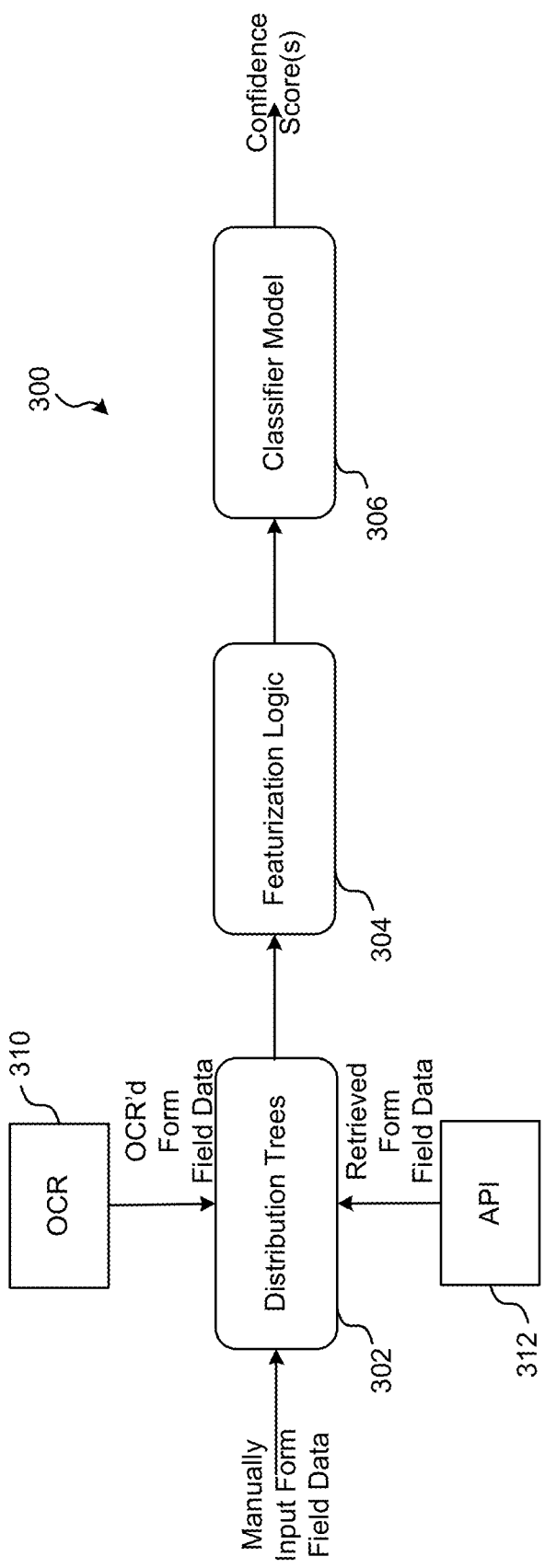
FIG. 3 shows a functional block diagram of a confidence model using inter-field correlations according to an embodiment of the present disclosure.

FIG. 3 illustrates a functional block diagram of a confidence model 300 using inter-field correlations according to an embodiment of the present disclosure. The illustrated confidence model 300 has three components: one or more distribution trees 302, featurization logic 304, and a classifier model 306. In one or more embodiments, the distribution trees 302, featurization logic 304, and classifier model 306 may be called in series to determine and output one or more confidence scores for input form field data. In one or more embodiments, form field data may be manually input by a user through his or her user device (e.g., device 150 of FIG. 1), retrieved from another online service or database using an API call or process 312, or retrieved from a document provided by a user or service using an OCR process 310.

In one or more embodiments, there is a distribution tree 302 for each field in a document or form used to input the data. For example, for an electronic tax preparation application, a user is often required to input information from his or her W-2 form. In this scenario, there may be one distribution tree for each field of the W-2. FIG. 5 illustrates a portion of an example W-2 form 500 having eight fields identified as Boxes 502-516. In accordance with the disclosed principles, each distribution tree predicts the distribution of one field/Box on the W-2 based on the values of one or more other fields/Boxes extracted from the W-2. For example, there will be a distribution tree for the first field typically labeled Box 1 "Wages, tips, other compensation" (see Box 1 502 illustrated in FIG. 5). Unique to the disclosed principles is that the distribution tree for Box 1 includes nodes for evaluating values of one or more other fields (e.g., Boxes 2-8 504-516 in the FIG. 5 W-2 form 500). This allows the distribution tree for Box 1 to predict the distribution of Box 1, P(Box1), using inter-field correlations and as a calculation of P(Box1=box1|Box2=box2, Box3=box3 . . . , Box8=box8). The distribution tree for Box 2 would include nodes for evaluating values from Boxes 1 and 3-8; the distribution tree for Box 3 would include nodes for evaluating values from Boxes 1, 2 and 4-8; and so on. It should be understood that a form field may be predicted by evaluating less than all other fields in the document. For example, the distribution tree for Box 2 could just use values from Boxes 1 and 3.

The featurization logic 304 generates features from the outputs of the distribution trees 302. These features are field-agnostic in that they can be generated from the output of any distribution tree, and are comparable across fields. One example feature in the W-2 example includes the Z-score (value_z_score) of a particular field (e.g., Box 1). In one embodiment, the Z-score (value_z_score) may be the difference between the extracted value and the mean from the relevant distribution tree node, divided by the standard deviation. In one or more embodiments, the following additional features may by determined by the featurization logic 304: abs_value_z_score (the absolute value of the Z-score); value_above_p80 (whether the extracted value is above the 80th percentile of the field for examples in the leaf node); value_below_p20 (whether the extracted value is below the 20th percentile of the field for examples in the leaf node); leaf_node_samples (how many documents are in the leaf node); and leaf_node_density (what fraction of all documents used to train the distribution tree are in the leaf node). The leaf_node_samples and leaf_node_density features do not require comparing the extracted value of the field in question with any statistics; they capture whether the combination of other fields from the same document is common or rare. All of these features may have a relatively high importance in the classifier model 306.

The classifier model 306 predicts whether the value extracted for a single field is most likely correct based on field-level features, including those derived and output from the featurization logic 306. The output of the classifier model 306 is a confidence score. In one or more embodiments, the same classifier model 306 is used for one or more fields of the same document. In one embodiment, the classifier model 306 is a machine-learning model such as a random forest classifier (RFC) model. A random forest classifier is suitable for use with the disclosed distribution trees. It should be understood that any classifier model could be used as long as it set up to input the extracted features and is trained in accordance with the disclosed principles. Some examples include a binary classifier, tree-based and non-tree-based classifiers, boosted and or deep learning models.

In one or more embodiments the confidence model 300 is trained based on similar documents (e.g., documents of the same type) retrieved and or stored by the service. In one or more embodiments, similar documents/documents of the same type are documents having the same set or subset of fields. Typically, the fields have standardized meanings. That is, any two W-2s would be of the same type, any two 1099-Gs would be of the same type, etc. In an example where the electronic service is a tax preparation application and the input document is a W-2 form, each distribution tree 302 is trained using other W-2 form data from other users of the service. The training of the distribution trees 302 may be performed by any method suitable for training decision trees. The training of the distribution trees 302 may be performed at any desired frequency (e.g., daily, weekly, bi-weekly, monthly, to name a few). As can be appreciated, the more samples in the training sets for each distribution tree 302, the more accurate and complete the trees 302 will be.

The training may further include processing the outputs of the trained distribution trees 302 through the featurization logic 304 to extract features from the trained trees 302. Output features from the featurization logic 304 as well as other features may then be input into the classifier model 306 to train the model 306. Once the training is completed, the distribution trees 302, featurization logic 304, and classifier model 306 can be used to provide confidence scores, where the scores indicate the confidence or likelihood that form field data is correct, in accordance with the disclosed principles. The inventors have determined that the classifier model became more accurate when the distribution trees were regularized during training, thereby increasing the range of leaf node sizes within the trees.

Figure 4:
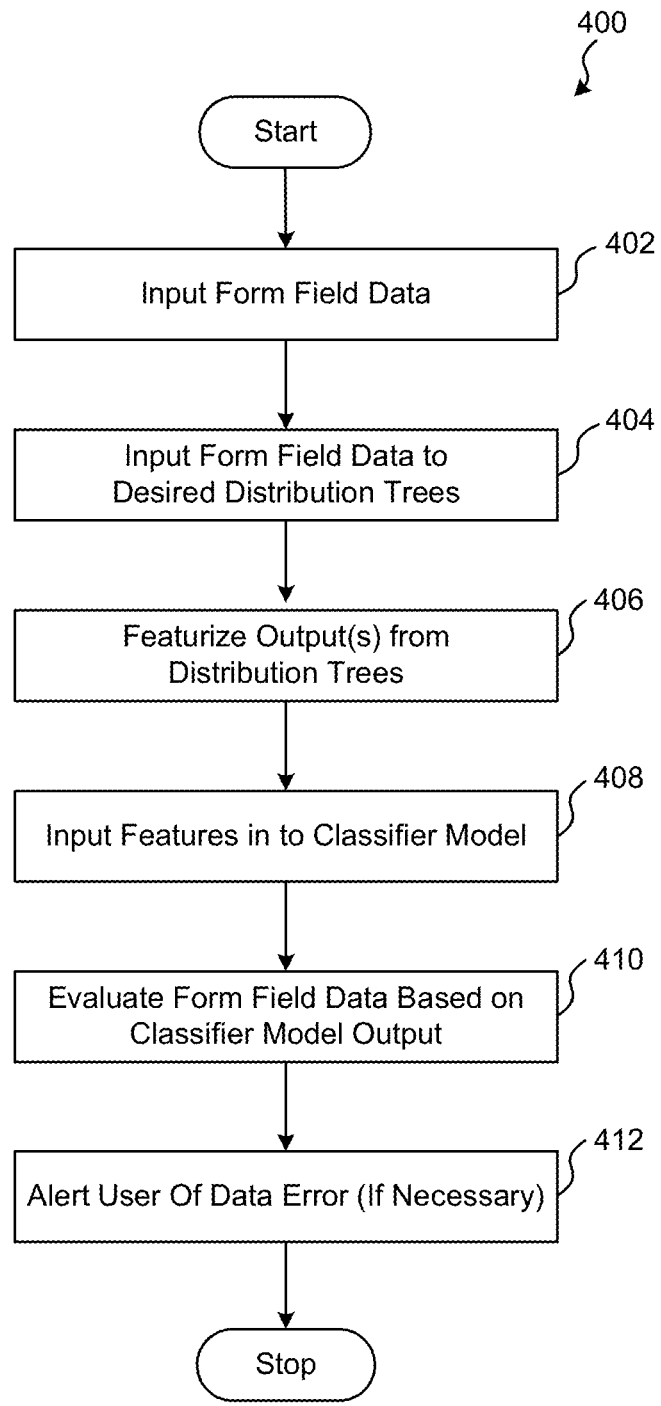
FIG. 4 shows an example process for determining a confidence level of input data using inter-field correlations in accordance with an embodiment of the present disclosure.

FIG. 4 illustrates an example process 400 for determining a confidence level of input data using inter-field correlations. In one embodiment, system 100 may perform some or all of the processing illustrated in FIG. 4. For example, first server 120 may execute the steps of the process 400 as part of the first service 122. The first server 120 and or first service 122 may input and or use form field data from, or store the data and or processed data in, one or more of the first database 124 and or user device 150.

At step 402, form field data is input from a user or user device. In one or more embodiments, all of the necessary form field data for a particular document is input at step 402. For example, if the data is be used for a tax return, the document may be a W-2 form having multiple fields. Each field required by the tax return may be input at step 402. In addition, each field required by the disclosed inter-field correlation processing may be entered at step 402 as well.

The form field data may be pulled from the document using an optical character recognition (OCR) process. That is, the user may upload or identify a document having the desired form field data and an OCR process retrieves the desired form field data. Step 402 may also comprise receiving form field data that was manually entered by the user. In addition, step 402 may retrieve the data on behalf of the user using e.g., an application programming interface (API) call that grabs the desired data from a document or form hosted by another service or repository. Regardless of the how form field data is input, it is desirable to predict whether it is accurate, and associate a level of confidence with that prediction, by processing it through the remaining steps of process 400.

To accomplish this goal, the input form field data are used as inputs to the relevant distribution trees at step 404. Continuing with the example that the electronic service is a tax preparation service and the required form field data is input/extracted data from a W-2 form, step 404 may include the use of a distribution tree for each relevant field in the W-2 (e.g., Boxes 1-8 502-516 in the FIG. 5 W-2 form 500). The input W-2 field data is input into the distribution trees (e.g., distribution tree 302 of FIG. 3) with each tree providing a respective output as discussed above with respect to FIG. 3.

At step 406, the outputs from each distribution tree undergo a featurization process that extracts desired features from the outputs. In one or more embodiments, the featurization process at step 406 is performed using the featurization logic 304 to obtain the features discussed above with respect to FIG. 3.

At step 408, the features extracted at step 406 are used as inputs to a trained classifier model for the document (e.g., W-2). In one or more embodiments, features independently generated from the field (e.g., Box 1) of the extracted payload (e.g., for an OCR payload, this may include the number and variety of characters extracted, and the dimensions of the bounding box around these characters) also may be passed to the classifier model at step 408. In one or more embodiments, the classifier model is one of the machine-learning and trained classifier models 306 discussed with respect to FIG. 3. In one or more embodiments, each field is evaluated separately to obtain a confidence score for the field.

At step 410, the accuracy of the form field data is predicted based on the confidence scores output from the classifier model at step 408. In training, examples of correct and incorrect extraction are found (i.e., the value for a field from e.g., the OCR pipeline can match the ground truth (correct) or not match it (incorrect)). The disclosed principles then associate features with these examples and train the classifier to predict whether each extraction is correct. If the features for a field on a new document are more consistent with a correct extraction, that will lead to a higher confidence score at step 410. If the features are more consistent with an incorrect extraction, that will lead to a lower confidence score at step 410.

As discussed above, the disclosed principles may use a "Z-score" as an input to the classifier model. For example, the Z-score represents the number of standard deviations the extracted value is away from the mean. If the Z-score is high, for example, the form field value is larger than most examples seen during training for other comparable documents and the classifier model output indicates that the extracted value is most likely incorrect. Conversely, if the Z-score is close to zero, the form field value is close to the mean of examples seen during training and the classifier model output indicates that the extracted value is likely to be correct. In one or more embodiments, the classifier model outputs a score from 0 to 1, with higher scores indicating the value is more likely to be correct.

At step 412, an alert may be presented to the user or user device 150 if the process 400 has determined that the input form field data is most likely incorrect at step 410. Any suitable alert can be presented. In one or more embodiments, the user may be prompted to re-enter the form field data by the same or other method (including manual entry and or uploading another copy of the document). The alert can be displayed on a graphical user interface of the user device 150. The alert may be visual, audible and or haptic. The process 400 may begin at step 402 to allow the user to input the necessary data and process it through steps 404 and 410.

The following example illustrates one use case for process 400. In this example, it is desired to determine a confidence score for Box 1 on a new W-2 uploaded by a user at step 402. An image of the W-2 is sent to an OCR engine (e.g., as part of process 310 in FIG. 3), which outputs text, positional information for this text, and other information for Box 1 and other fields in the W-2. To apply the confidence model 300, the extracted values from Boxes 2-8 are passed to the Box 1 distribution tree at step 404. The process 400 algorithmically traverses the Box 1 distribution tree and arrives at one leaf node where documents seen in training had similar combinations of Boxes 2-8. The output from the Box 1 distribution tree may be a set of statistics (e.g., mean and standard deviation of Box 1) describing the documents in this leaf node. At step 406, features are generated from these statistics, in some cases by comparing them with the value of Box 1 extracted from the current W-2. For example, the Z-score of Box 1 (value_z_score) as well as other features discussed above, along with features independently generated from the Box 1 portion of the OCR payload (e.g., the number and variety of characters extracted, and the dimensions of the bounding box around these characters) may be passed to the classifier model at step 408. Step 410 may evaluate the output of the classifier model and step 412 may be used to alert the user of potentially incorrect data as determined at step 410.

Figure 6:
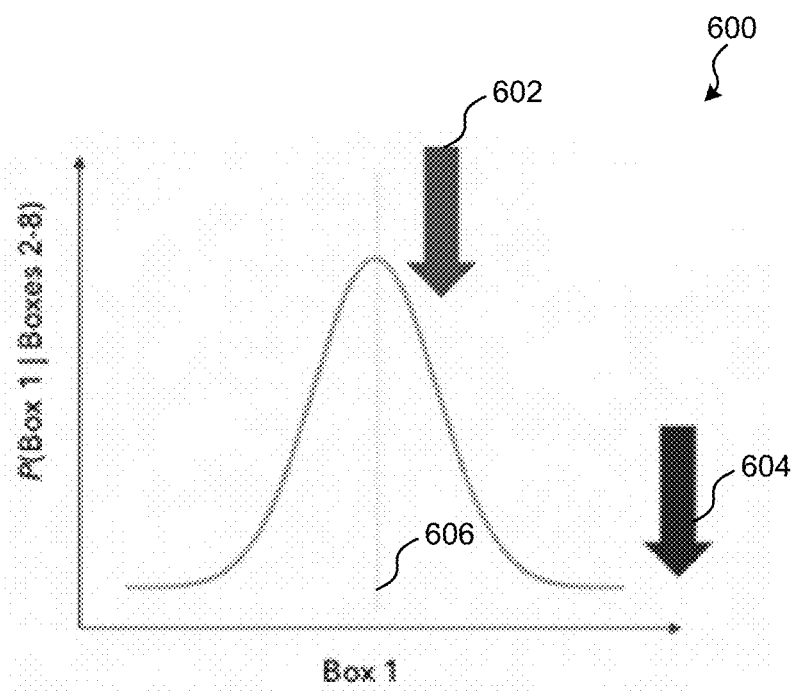
FIG. 6 illustrates an example distribution of one form field in a certain set of documents in accordance with the disclosed principles.

An example featurization at step 406 is shown in FIG. 6, which illustrates an example distribution 600 of Box 1 values in a certain set of documents. In one or more embodiments, that set could be the documents found in a certain (leaf) node of a distribution tree—i.e., documents seen in training with similar combinations of boxes 2-8 in accordance with the disclosed principles. In the illustrated example, the Y-axis represents the conditional probability that Box 1 has the value on the x-axis determined using inter-field correlation in accordance with the disclosed principles. The X-axis shows the value of Box 1 (e.g., a dollar amount) based on the data input at step 402. It is possible to consider this value as representing the Z-score of this value, which can be calculated if the mean and standard deviation of Box 1 for the set of documents is known. As shown in FIG. 6, arrow 602 represents a small Z-score and a Box 1 value that is relatively close to the mean 606. As such, the input Box 1 data may be determined in step 410 to be accurate. On the other hand, arrow 604 represents a large Z-score and a Box 1 value that is relatively far from the mean 606, meaning that the input Box 1 data is most likely not accurate.

Figure 7:
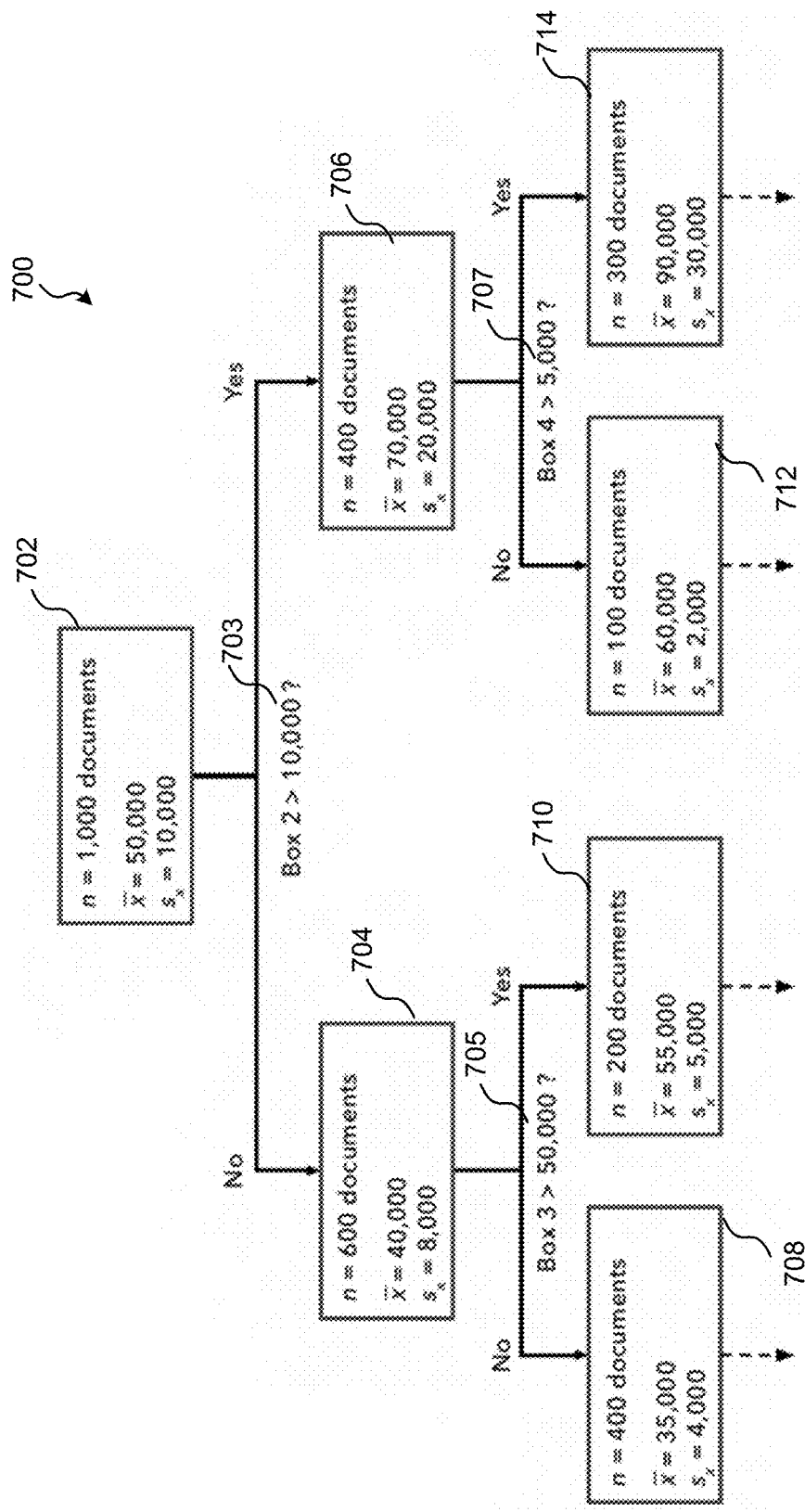
FIG. 7 illustrates an example distribution tree in accordance with the disclosed principles.

FIG. 7 illustrates an example distribution tree 700 in accordance with the disclosed principles. In the illustrated example, the distribution tree 700 is used for box 1 of a W-2. The tree 700 consists of a root node 702, which in the illustrated example has a first parameter n that is the number of documents for this node, a second parameter $\bar{x}$ that is the mean of Box 1 values for documents in the node and a third parameter $s_x$ that is the standard deviation of Box 1 values for the node. In the illustrated example, n=1,000, $\bar{x}$=50,000 and $s_x$=10,000.

In the illustrated example, the root node 702 branches into two other nodes 704, 706 based on a splitting criterion 703. During training, each document in a parent node is assigned to one of two child nodes based on whether the criterion is true or not. This process is repeated, splitting on other features (boxes) from the document, until the tree is fully built out. Then, at inference time, the same criteria are used to traverse the trained tree for a new document and predict what distribution (mean and standard deviation) the document's Box 1 value will fall into. In the illustrated example, the splitting criterion 703 is "Box 2>10,000". If Box 2 represents "Federal Income tax withheld" (see FIG. 5), the splitting criterion 703 is whether the input form field data for Box 2 was greater than $10,000. According to the example, if the result of the splitting criterion 703 is "yes", the root node 702 branches to node 706 and if the result of the switching criterion 703 is "no", the root node 702 branches to node 704.

In the illustrated example, the parameters for node 704 are n=600, $\bar{x}$=40,000 and $s_x$=8,000 and the parameters for node 706 are n=400, $\bar{x}$=70,000 and $s_x$=20,000. Node 704 branches to nodes 708 if the result of the splitting criterion 705 is "no" and branches to node 710 if the result of the splitting criterion 705 is "yes". In the illustrated example, the splitting criterion 705 is whether the value of Box 3 is greater than $50,000 (i.e., "Box 3>50,000"). In the illustrated example, the parameters for node 708 are n=400, $\bar{x}$=35,000 and $s_x$=4,000 and the parameters for node 710 are n=200, $\bar{x}$=55,000 and $s_x$=5,000.

Node 706 branches to node 712 if the result of the splitting criterion 707 is "no" and branches to node 714 if the result of the splitting criterion 707 is "yes". In the illustrated example, the splitting criterion 707 is whether the value of Box 4 is greater than $5,000 (i.e., "Box 4>5,000"). In the illustrated example, the parameters for node 712 are n=100, $\bar{x}$=60,000 and $s_x$=2,000 and the parameters for node 714 are n=300, $\bar{x}$=90,000 and $s_x$=30,000. If Box 3 represents "Social security wages" (see FIG. 5), splitting criterion 705 is whether the form field data for Box 3 was greater than $50,000 and splitting criterion 707 is whether the form field data for Box 4 was greater than $5,000.

As can be appreciated, the disclosed systems and processes provide several advantages and improvements to the electronic form field data entry and processing fields. The inventors have determined and verified that distribution tree-based features improve the confidence model's performance, both in terms of standard machine learning metrics and metrics specific to potential use cases (e.g., electronic tax return preparation services, online accounting and financial services, to name a few).

One reason for the better results obtained by the disclosed principles is the stacking of the two types of models together, such that the distribution trees' outputs are featurized for the classifier model. The disclosed architecture ties the correctness of each extracted value to the pattern of values seen on the entire document, and lets the classifier model learn from the joint distributions of many fields while remaining field-agnostic. Moreover, featurizing the distribution trees' leaf node size to capture whether combinations of extracted values are common or rare, and tuning hyperparameters to increase the range of leaf node sizes for this purpose, is also something unique to the disclosed principles. Thus, the disclosed principles provide a specific technical solution to a technical problem in the electronic form input and processing fields. The problem is specific to the computerized technology and processing, and is solved through a novel use of technical innovation.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method of evaluating form field data within a first document, said method being performed on a computing device, said method comprising:
   inputting input data from a plurality of fields within the first document into one or more distribution trees associated with the fields, each distribution tree corresponding to a respective field within the first document and using data from other fields within the first document to evaluate the input data from the respective field;
   obtaining, from the outputs of each distribution tree, one or more features of the input data for the respective field within the input data; and
   inputting the one or more features into a trained classifier model to obtain a confidence score for a value of the respective field within the input data, the confidence score indicating whether the value of the respective field in the input data is accurate.

2. The method of claim 1, wherein inputting input data from a plurality of fields comprises performing an optical character recognition process on an image of the first document to obtain the data from the plurality of fields within the image of the first document.

3. The method of claim 1, wherein inputting input data from a plurality of fields comprises requesting the data from the plurality of fields from a service hosting the first document for the user.

4. The method of claim 1, wherein obtaining the one or more features of the input data comprises determining a Z-score of the respective field's value.

5. The method of claim 1, wherein obtaining the one or more features of the input data comprises determining one or more of: a Z-score of the respective field's value; the absolute value of the Z-score; whether the value is above a first predetermined percentile of the respective field for examples in a leaf node; whether the value is below a second predetermined percentile of the respective field for examples in the leaf node; how many documents are in the leaf node; and what fraction of all documents used to train the distribution tree are in the leaf node.

6. The method of claim 1, further comprising determining whether input data for a particular field is accurate or not based on an associated confidence score output from the model.

7. The method of claim 6, further comprising providing an alert to a user device when it is determined that the input data for the particular field is not accurate based on the associated confidence score.

8. The method of claim 1, further comprising training the one or more distribution trees associated with the fields using data from other documents of the same type as the first document.

9. The method of claim 8, further comprising training the classifier model using features obtained from the one or more trained distribution trees and using data from one or more fields within the other documents of the same type as the first document.

10. A system comprising:
a first computing device configured to:
input data from a plurality of fields within a first document into one or more distribution trees associated with the fields, each distribution tree corresponding to a respective field within the first document and using data from other fields within the first document to evaluate the input data from the respective field;
obtain, from the outputs of each distribution tree, one or more features of the input data for the respective field within the input data; and
input the one or more features into a trained classifier model to obtain a confidence score for a value of the respective field within the input data, the confidence score indicating whether the value of the respective field in the input data is accurate.

11. The system of claim 10, wherein the first computing device inputs data from a plurality of fields by performing an optical character recognition process on an image of the first document to obtain the data from the plurality of fields within the image of the first document.

12. The system of claim 10, wherein the first computing device inputs data from a plurality of fields by requesting the data from the plurality of fields from a service hosting the first document for the user.

13. The system of claim 10, wherein the first computing device obtains the one or more features of the input data by determining a Z-score of the respective field's value.

14. The system of claim 10, wherein the first computing device obtains the one or more features of the input data by determining one or more of: a Z-score of the respective field's value; the absolute value of the Z-score; whether the value is above a first predetermined percentile of the respective field for examples in a leaf node; whether the value is below a second predetermined percentile of the respective field for examples in the leaf node; how many documents are in the leaf node; and what fraction of all documents used to train the distribution tree are in the leaf node.

15. The system of claim 10, wherein the first computing device is further configured to determine whether input data for a particular field is accurate or not based on an associated confidence score output from the model.

16. The system of claim 10, wherein the first computing device is further configured to provide an alert to a user device when it is determined that the input data for the particular field is not accurate based on the associated confidence score.

17. The system of claim 10, wherein the first computing device is further configured to train the one or more distribution trees associated with the fields using data from other documents of the same type as the first document.

18. The system of claim 17, wherein the first computing device is further configured to train the classifier model using features obtained from the one or more trained distribution trees and using data from one or more fields within the other documents of the same type as the first document.

* * * * *